April 29, 1952   C. H. O. BERG   2,594,615
ADSORPTION PROCESS AND APPARATUS THEREFOR
Filed Sept. 10, 1946
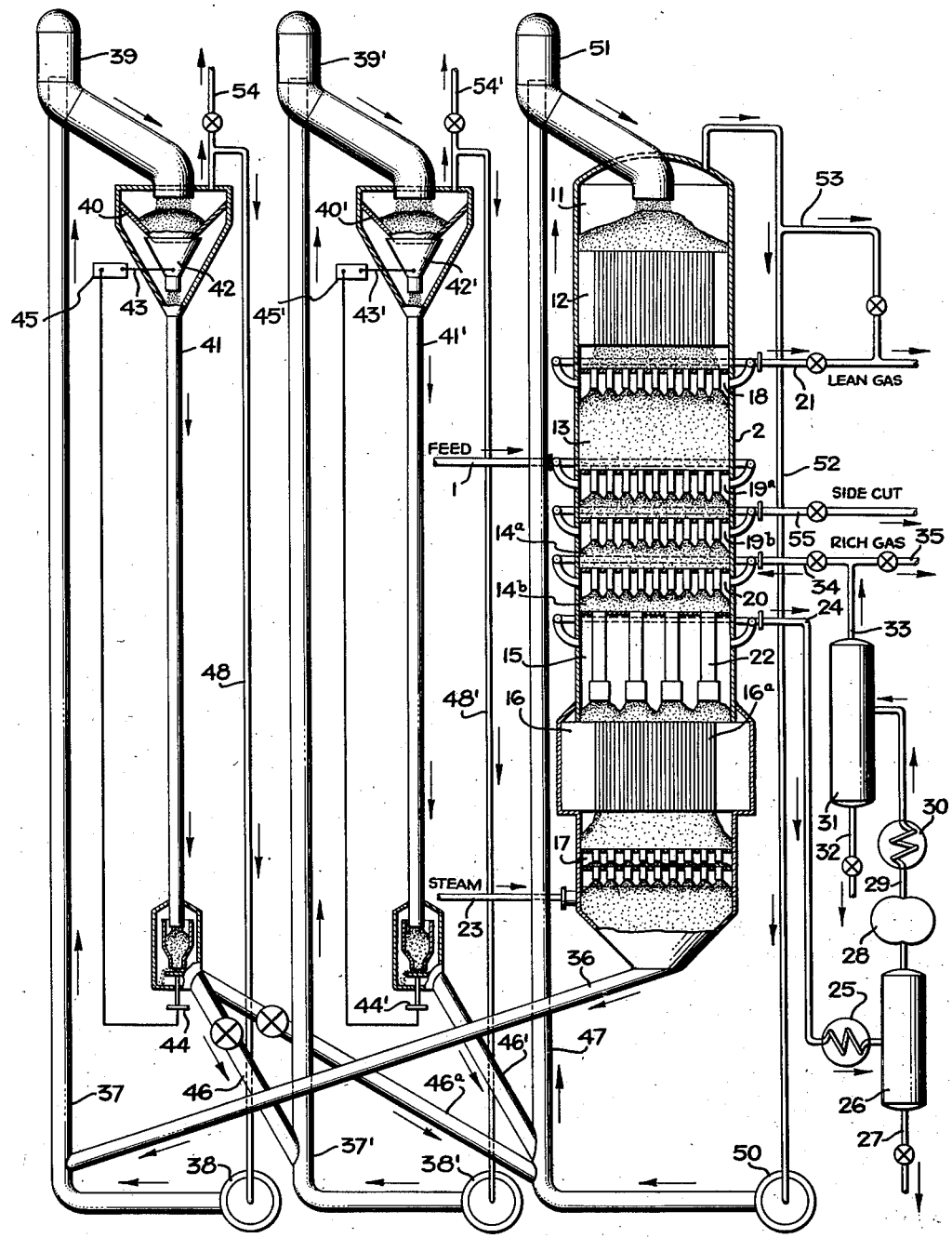
INVENTOR.
Clyde H. O. Berg
BY
Ross J. Garofalo
ATTORNEY Patented Apr. 29, 1952

2,594,615

UNITED STATES PATENT OFFICE 2,594,615

ADSORPTION PROCESS AND APPARATUS THEREFOR

Clyde H. O. Berg, Long Beach, Calif., assignor to Union Oil Company of California, Los Angeles, Calif., a corporation of California Application September 10, 1946, Serial No. 696,017

16 Claims. (Cl. 183—4.2)

This invention relates to the separation of gaseous mixtures by selective adsorption of certain of the components of such mixtures on granular charcoal and applies particularly to the separation of gases which are somewhat difficult to recover efficiently from an adsorbent on which they are adsorbed.

The separation of gaseous mixtures into constituent components may be accomplished by fractional distillation, solvent extraction, selective adsorption, and similar processes. In so separating gaseous mixtures in which the gaseous components possess low critical temperatures the operational difficulties encountered in liquefaction thereof render such processes as distillation, liquid-liquid extraction, and the like, economically impracticable. It has been found that such gaseous mixtures may be conveniently separated by the process of selective adsorption on a solid granular adsorbent as more clearly illustrated hereinafter. Among the petroleum hydrocarbons those compounds of lower molecular weight generally exhibit the lowest critical temperatures and it is these normally gaseous hydrocarbons that are most generally separated by such adsorption process. For example, in a mixture of hydrocarbons of the aliphatic series ranging from methane through ethane, ethylene, acetylene, propane, propylene, methyl acetylene, butanes, butylenes, butadiene, ethyl and vinyl acetylenes, and even pentanes, etc., separation of such a mixture into its individual constituents by means of fractional distillation is rendered difficult due to the exceedingly low temperatures and high pressures necessary to liquefy these gases.

Gaseous mixtures containing valuable hydrocarbons are encountered in large amounts in many processes, such as for example, thermal or catalytic cracking of hydrocarbon fractions for the production of high grade material fuel, or the like. In such processes, a hydrocarbon feed stock such as gas oil, or the like, is cracked by subjection to extremely high temperatures or by contacting with a catalyst at more moderate temperatures. Upon cooling the resultant product to atmospheric temperature, and separating the liquid condensate, a gaseous mixture is obtained which contains predominantly normally gaseous hydrocarbons together with some normally liquid hydrocarbons. It is generally uneconomical to carry out operations at sufficiently high pressures or sufficiently low temperatures to recover, by distillation, or the like, any substantial proportion of the valuable $C_2$ and $C_3$ hydrocarbons contained in such a gaseous mixture. Consequently, these hydrocarbons, which may contain a high proportion of potentially valuable olefins such as ethylene, propylene, acetylene, and the like, are either wasted or employed as low-value fuel gas. The present process is applicable to the separation of any normally gaseous mixture, but is particularly applicable to the recovery or concentration of such valuable hydrocarbons from gaseous mixtures of hydrocarbons containing about five carbon atoms or less.

It is known that certain solid adsorbents such as, for example, activated charcoal or silica gel will adsorb some gases such as water vapor, benzene vapor, butane, and the like, more readily than they will other gases, such as hydrogen, nitrogen, methane, and the like, and that by heating the enriched adsorbent containing the adsorbed gases these gases may be liberated substantially completely and the adsorbents after being cooled again are capable of further selective adsorption. This has lead to the development of various processes for separation of gases, involving adsorption on solid adsorbents, heating the enriched adsorbents to liberate the adsorbed gases and cooling the thus regenerated adsorbent for further use. The present invention involves a process of this type which constitutes an improvement over any previous process described in that it affords greater efficiency of separation as well as greater simplicity of apparatus and operation.

In general, the process of separating gaseous mixtures by selective adsorption on granular charcoal involves the steps of counter-currently adsorbing certain components of the gaseous mixture in a charcoal bed, preferably in a moving bed of charcoal. In a moving bed operation the charcoal, upon which certain of the gaseous components have been adsorbed, flows from the adsorption zone through one or more rectification zones, as hereinafter described, and into a stripping section wherein the adsorbed components are desorbed from the charcoal by means of heat with the aid of a stripping gas such as, for example, steam. The tripped charcoal is subsequently cooled prior to repassage through the adsorption section. In a stationary bed operation the same series of cycles would of necessity be performed, and the same factors would be taken into consideration.

The degree of adsorbability of gases on charcoal or other adsorbents which possess the same properties as charcoal, is generally higher for gases of higher molecular weight. This is found to be particularly true with regard to the hydrocarbon series. Among the non-hydrocarbon gases there appears to be a correlation between adsorbability and critical temperature. Thus, gases of low critical temperature such as hydrogen, nitrogen, oxygen, and carbon monoxide are adsorbed to a lesser degree than gases of comparatively higher critical temperature such as chlorine, sulfur dioxide, hydrogen sulfide, ammonia, nitrous oxide, carbon dioxide, and the like, and separation between these components may be accomplished by selective adsorption according to the principles of the present invention. Similarly, the process of selective adsorption may be employed for the separation of hydrocarbon gases of higher molecular weight from those of lower molecular weight such as, for example, the separation of ethylene from methane, or the like, as well as for the separation of non-hydrocarbon gases of higher critical temperature from those of lower critical temperature.

For example, in the conventional process of selective adsorption, a gaseous mixture such as a mixture of hydrocarbons of various molecular weights, is divided into two separate fractions, one enriched in higher molecular weight components and the other enriched in the lower molecular weight components, the former being obtained by adsorption on the adsorbent in the adsorption section, and subsequent release in the stripping section, and the latter, by passing it through the adsorption section without adsorption, it being preferentially desorbed by the higher molecular weight components.

In a recent improvement in the art of selective adsorption and separation of gases an adsorption column has been provided which contains two or more rectification sections whereby it is possible through the utilization of a refluxing step within these rectification sections to separate a hydrocarbon mixture for example, to obtain not only a lean gas, i. e., a fraction rich in hydrocarbons of lower molecular weight, and a rich gas, i. e., a fraction rich in hydrocarbons of higher molecular weight, but also one or more heart cuts, i. e., fractions of relatively narrow intermediate molecular weight and boiling range. In the resolution of a normally gaseous hydrocarbon fraction containing, for example, methane, butane and any or all of the aliphatic hydrocarbons intermediate between methane and butane in a conventional selective adsorptive process, it is possible to obtain two components, one a rich gas enriched in the higher molecular weight hydrocarbons and the other a lean gas enriched in the lower molecular weight hydrocarbons, the dividing point between the two fractions being a function of such variable factors as the ratio of adsorbent such as charcoal to the feed stock, the charcoal flow rate, and the like. In the more recent improved process herein called "the heart cutting process," additional intermediate fractions or heart cuts are obtained. Thus, for example, the heavier components such as the $C_2$, $C_3$ and $C_4$ hydrocarbons as well as a small amount of methane, are adsorbed by the granular adsorbent in the adsorption section of the column, and the adsorbent is thereafter passed successively through a number of rectification sections. In the first rectification section it is subjected to a reflux of $C_2$ hydrocarbons, which reflux has the effect of insuring a minimum retention of methane on the adsorbent passing to the second rectification section. In the second rectification section the adsorbent is subjected to a reflux of $C_3$ hydrocarbons whereby the $C_2$ hydrocarbons are effectively desorbed from the adsorbent and may be removed from the column by appropriate means as a heart cut from the wider range feed stock. Additional rectification sections may be employed in which a progressively higher molecular weight reflux is used whereby further heart cuts of hydrocarbons of higher molecular weight than the $C_2$ hydrocarbons may be obtained, such as a $C_3$ heart cut, or a propylene heart cut, for example. However, for the purpose of clarity the description to follow will be with reference to an adsorption process and apparatus in which there are only two rectification sections employed, one to insure the desorption of any residual amounts of lean gas remaining adsorbed on the adsorbent leaving the adsorption section, and the second to effect the desorption of the heart cut that it is desired to recover.

In the separation of various gaseous mixtures by the process of charcoal adsorption the temperature necessary to effectuate substantially complete stripping of the adsorbed gases from the charcoal is a function of the molecular weight of these gases. Thus the higher the molecular weight of the adsorbed gases the higher the stripping temperature required. In many instances this is of little significance from other than an operational standpoint, but in certain cases the higher stripping temperatures are detrimental to the operation. For example, in the separation of a mixture of hydrocarbons containing butanes, butenes or butadiene and higher molecular weight hydrocarbons of either saturated or unsaturated nature, the utilization of high stripping temperatures causes a certain degree of polymerization of the valuable unsaturated components. This polymerization obviously reduces the recovery of these valuable components. Furthermore, the polymerized products are difficult to remove from the adsorbent in the stripping section, and as a result this impairs the adsorption capacity of the charcoal in succeeding operations. This effect appears to be cumulative and in such instances it becomes necessary at frequent intervals to remove the charcoal from the system and subject it to high temperature reactivation. Such procedure not only reduces the effective cycle life of the charcoal and thus increases operation costs, but it also tends to reduce the effective overall life of the charcoal and as a consequence increases charcoal costs. Although the disadvantages of high stripping temperatures are most readily apparent with relation to a readily polymerizable adsorbate such as above described, there are also instances involving adsorption of relatively non-polymerizable gases in which, as a result of one factor or another it would be desirable to accomplish the stripping operation at temperatures lower than those normally required. For example, where the selective adsorption is carried out under elevated pressures, the temperature of stripping in order to desorb any given component gas or gases will increase with an increase in pressure. Such increased temperatures may or may not have any effect on the gases to be stripped, but it is apparent that they will increase the cost of the stripping operation, and that from an economic standpoint there will be a temperature range above which the cost of stripping will be excessive. Exactly what this temperature range will be is impossible to formulate for it will vary with each individual gaseous mixture to be separated, as well as with plant size, available heating facilities, and numerous other factors, but that it exists will be obvious to any one skilled in the art of unit operations.

It is an object of the present invention, therefore, to provide a process for the separation of gaseous mixtures in which it is possible to carry out the adsorption and stripping steps within the same adsorption column at different pressures.

It is a further object of the present invention to provide an apparatus particularly adapted to the accomplishment of the aforementioned object.

Yet another and more specific object of my invention is to provide an apparatus which may be termed an "external sealing leg" wherein pressure differentials induced within a column of flowing granulated material may be compensated for.

Other objects and advantages of the present invention will become apparent to those skilled in the art as the description thereof proceeds.

Briefly I am able to accomplish the above contemplated objects by providing in a charcoal adsorption column as hereinafter more fully described, a section intermediate between the adsorption and rectification zones on the one hand and the stripping section on the other, which consists of one or more sealing tubes the length of which will control the pressure differential obtainable; and also providing the external sealing leg outside the column, as well as auxiliary equipment as described below.

In this process a feed gas is introduced into an adsorption column, and is partially adsorbed on the adsorbent in the adsorption zone. The adsorbent then flows from the adsorption zone through one or more rectification zones wherein equilibrium adsorption is induced and from thence it flows through the aforementioned sealing tubes into the stripping section, which is operated at a lower pressure. In the stripping section the adsorbent containing the adsorbed components of the feed is heated and contacted with a stripping gas at a temperature sufficient to desorb these components. The desorbed components are withdrawn from the stripping section, as by taking suction thereon with a compressor, and are compressed to a pressure somewhat greater than the pressure existing in the adsorption and rectification zones. After the removal of the water and condensed feed components, if there be any of the latter, the compressed gas is recycled to the last rectification zone so as to provide reflux for attaining the adsorption equilibrium above mentioned.

Inherent in such a process is the problem of withdrawing the adsorbent from the bottom of the column below the stripping section at one pressure and introducing the same to the top of the column above the adsorption zone at a different and somewhat higher pressure. This could be done by the use of a single conventional sealing leg at the bottom of the column, but such a sealing leg would be quite long and when an appreciable pressure drop is employed, would require elevation of the column to an awkward or even impracticable height. A method of overcoming this problem which has proved most satisfactory consists of the utilization of the external sealing leg described below. Such an external sealing leg permits the use of a gas lift conveyance system and at the same time provides the necessary pressure differential between the bottom and the top of the column. The means whereby this is accomplished will be more readily understood by reference to the accompanying drawing.

In the description of the embodiment of my invention shown in the accompanying drawing, for purposes of greater clarity, the process will be described as employing charcoal as the adsorbent, and as employing a specific separation and a specific type of feed. Thus, if there is assumed a gaseous mixture comprised for the sake of simplicity of hydrocarbons of at least three carbon atoms including members of both the saturated and unsaturated type, it is possible in the process and apparatus as shown, to separate this type of feed into a lean gas fraction of substantially pure $C_3$ hydrocarbons, a side cut fraction of substantially pure $C_4$ hydrocarbons, a rich gas fraction of substantially pure $C_5$ hydrocarbons and a liquid fraction of $C_5$ and heavier hydrocarbons. It is to be understood, however, that this specific operation is used only for purposes of description and that the invention applies to the separation of any gaseous mixture to obtain any fractions which it may be desirable to separate by means of a selective adsorption process, using charcoal or any other adsorbent such as silica gel, or the like, as herein disclosed.

Referring to the drawing the above-mentioned feed stock is introduced by means of line 1 to the adsorption column 2 at a point intermediate between the adsorption section 13 and the rectification sections 14a and 14b. The adsorption column 2 includes in the embodiment shown, charcoal hopper 11, cooler 12, adsorption section 13, rectification sections 14a and 14b, sealing section 15, stripping section 16, and the solid feeder 17. Between the cooler, adsorption section, rectification sections, and sealing section there are interposed the disengagers 18, 19a, 19b, and 20. The charcoal flows from the hopper 11 through the cooler 12 and the disengager 18 into the adsorption section 13 wherein it is contacted with the incoming feed which flows from line 1 countercurrently to the charcoal through the tubes of disengager 19 into the adsorption section 13. In the adsorption section 13 the $C_4$ and heavier hydrocarbons and possibly a small portion of the $C_3$ hydrocarbons are adsorbed on the charcoal, leaving the major portion of the $C_3$ hydrocarbons as unadsorbed gases which are withdrawn from the adsorption section at disengager 18 by means of line 21. This unadsorbed gas may be termed "lean gas" regardless of the character of the feed.

The charcoal containing adsorbed thereon $C_4$ and heavier hydrocarbons together with some $C_3$ hydrocarbons flows from the adsorption section 13 through the disengager 19 into the primary rectification section 14a. In this section the charcoal is contacted with additional quantities of $C_4$ hydrocarbons desorbed from the charcoal in secondary rectification section 14b as described below, so as to effect therein the selective desorption of any $C_3$ hydrocarbons which may be present in the charcoal. The desorbed $C_3$ hydrocarbons thereafter pass countercurrently to the charcoal with the feed into the adsorption section 13, and from thence out through line 21. The charcoal from section 14a passes into section 14b. Here it is contacted with additional quantities of $C_5$ hydrocarbons introduced through line 34 as reflux. This serves to desorb the $C_4$ hydrocarbons. Part of the desorbed $C_4$ is returned to section 14a as reflux as described above, and the remainder is withdrawn through line 55 as a side cut. The charcoal then passes from the rectification section 14b through the disengager 20 into the sealing section 15. The sealing section 15 is comprised of numerous sealing tubes 22, whereby the effective diameter of charcoal flow is restricted so as to permit the existence of a relatively high pressure differential between the rectification section 14 and the stripping section 16 without permitting excessive flow of gas. Although it is not necessary it has been found that better results are obtained if the sealing tubes 22 in the sealing section 15 are flared or enlarged at the bottom ends thereof so as to prevent the discharge of the charcoal into the stripping section at a high velocity.

Steam is introduced into the lower portion of the adsorption column by means of line 23 and flows countercurrently to the charcoal through the solids feeder 17 and through the tubes 16a of the stripping section 16. The portion of the stripping section between the lower end of the sealing tubes 22, and the upper ends of the stripping tubes 16a constitutes what may be termed a steam treating section and to all intents and purposes it is this region which is critical as far as the effect of temperatures on the adsorbed gases is concerned. It is of course at a somewhat lower temperature than the stripping tubes themselves but the majority of the stripping actually takes place in this so-called steam treating section. Herein the $C_5$ and heavier hydrocarbons adsorbed on the charcoal are desorbed by the combined action of the heat and the steam, and by virtue of the pressure differential existing between the upper and lower extremities of the sealing tubes 22, the desorbed hydrocarbons and steam flow into the free space of the sealing section rather than back through the sealing tubes. The steam-hydrocarbon mixture is withdrawn from the sealing section 15 by means of line 24 and passes through the heat exchanger 25 into an initial separator 26 wherein the bulk of the steam is condensed from the hydrocarbons and is withdrawn as water by means of line 27. The compressor 28 takes suction on separator 26 and discharges the gases therefrom through line 29 and heat exchanger 30 and into separator 31. In separator 31 the hydrocarbons now at atmospheric pressure or above, are separated into a liquid $C_5$ and heavier hydrocarbon fraction and a gaseous $C_5$ hydrocarbon fraction. The liquefied hydrocarbons and any additional steam condensate are withdrawn from the separator 31 by means of line 32 and the gaseous hydrocarbons are removed therefrom by means of line 33.

A portion of the compressed $C_5$ hydrocarbons are returned by means of line 34 to the adsorption column, being introduced therein at disengager 20 so as to create a positive pressure at that point. A portion of these $C_5$ hydrocarbons will flow downwardly in the sealing tubes 22 thereby preventing the upflow of the stripped components, and another portion will flow upwardly through the disengager 20 into the rectification section 14b to serve therein as reflux to insure the desorption of any adsorbed $C_4$ hydrocarbons as described above. The $C_5$ hydrocarbons which are not recycled to the adsorption column are withdrawn from the system by means of line 35. The indirect cooling in cooler 12 and the indirect heating of tubes 16a in stripper 16 may be carried out by any conventional means such as circulation of cooling and heating fluids, respectively.

Charcoal flows from the stripping section 16 through the solids feeder 17 which may be any convenient means for controlling the rate of flow of the charcoal through the system, and from thence through the transfer line 36 into the gas lift line 37. Lift gas, which may be methane or any fixed gas, or lean gas such as that removed through line 21, is forced into the gas lift line 37 by blower 38 and picks up the charcoal deposited therein via line 36 carrying it upwardly into the charcoal gas separator 39. The particular charcoal gas separator shown may be described as an impactless separator and is described in detail in the co-pending application Serial No. 618,345. Herein the charcoal-gas suspension is broken and the charcoal flows into the hopper 40 located at the upper end of the sealing leg 41. This sealing leg 41 may be of any desired length but where only one sealing leg is used, it must be of sufficient length to provide a pressure differential from the top to the bottom of the column of charcoal equivalent to at least the pressure differential existing in the adsorption column. If the latter pressure differential is so high as to make the height of a single sealing leg 41 excessive, more than one such sealing leg may be used as illustrated, the effective height of the combination being the sum of the heights of each sealing leg, e. g., the height of 41 plus 41' in the figure. This sealing system as shown comprises hoppers 40 and 40' which empty into receptacles 42 and 42' suspended by means of lever arms 43 and 43' directly above the sealing legs 41 and 41'. The suspended receptacles 42 and 42' actuate control valves 44 and 44' located at the lower ends of sealing legs 41 and 41'. This remote operation of control valves 44 and 44' may be accomplished by an electrical or compressed air controller such as shown diagrammatically as controllers 45 and 45'. It is to be understood that any means of maintaining a constant level for this column of charcoal may be employed and that the means illustrated is only one embodiment thereof.

As the charcoal flows from the charcoal gas separator 39 into the hopper 40 a corresponding quantity will be released from the sealing leg by the control valve 44 and will pass through the transfer line 46 into a second gas lift line 37', and similarly, the charcoal from control valve 44' will pass through transfer line 46' to gas lift line 47. If only one external sealing leg is required, of course the charcoal in line 46 will be passed directly to gas lift line 47 through line 46a. The gas separated from the charcoal in separators 39 and 39' is withdrawn from hoppers 40 and 40' by means of lines 48 and 48' and is returned to the blowers 38 and 38' to repeat the cycle. The charcoal flowing through the transfer line 46' into the gas lift line 47 is carried therein by means of a positive stream of lift gas furnished by the blower 50 to another charcoal gas separator 51 which functions in the same manner as separators 39 and 39'. The charcoal gas separator 51 empties into hopper 11 of the adsorption column 12 and the lift gas is withdrawn therefrom by means of line 52 and returned therein to the blower 50 to repeat the cycle. If desired, a portion of the lean gas normally discharged through line 21 may be passed through cooler 12 and hopper 11 and withdrawn through the upper part of line 52 and by-pass line 53, and thence withdrawn through line 21 as indicated. This has the effect of drying the charcoal in hopper 11 and cooler 12 so as to remove any residual steam adsorbed thereon. It may also be desirable to withdraw a small stream of gas from lines 48 or 48' through lines 54 or 54' employing a vacuum pump for this purpose if necessary. Such withdrawal prevents leakage of lean gas from line 47 through lines 46', 48', 37', 46, 41, 48, 37, and 36 back into the bottom of column 2, where it might contaminate the rich gas withdrawn through line 24. Such possibility of contamination is entirely avoided if enough gas is withdrawn from lines 54 or 54' to cause a flow of gas concurrent with the charcoal in line 36.

Also if desired, an automatic pressure control may be obtained by connecting lines 48 and 48' with a line containing an automatic valve set to allow passage of gas from 48' to 48 at any time that the pressure differential exceeds the desired value. A similar line containing a similar automatic valve may connect lines 52 and 48' so as to prevent an excessive pressure drop here. If additional sealing legs 41 are employed, obviously additional corresponding control lines may be used.

It is apparent that additional sealing legs such as 41 with its accompanying equipment may be employed in any numbers in any length to accomplish the pressure seal required. Thus, we may impose a pressure differential between the rectification and stripping sections of column 12 of substantially any magnitude and compensate therefor in the charcoal system by the use of one or more of such sealing legs. This may be done by simply employing a number of gas lift systems and level controlled sealing legs whereby the charcoal discharged from one is introduced into a gas lift line and deposited thereby at the top of a second sealing leg similar to the ones shown. This unit consisting of the sealing leg with suitable level control provision, the gas lift system and the charcoal gas separator, may be repeated any desired number of times so as to provide substantially unlimited possibility for pressure compensation. In this manner there is provided what may be termed an external sealing leg so as to limit the necessity of a single leg of excessive length to provide the necessary pressure differential between the point of withdrawal of charcoal from the bottom of the column and the point of introduction thereof at the top of the adsorption column.

It is to be understood that this embodiment of the invention contemplates primarily an improved adsorption process wherein the stripping operation is rendered more efficient by the reduction of pressure therein in relation to the pressure in the adsorption step and thus any modification may be made in the particular method in which the adsorption, pretreating and subsequent treatment is carried out without departing from the scope of the invention. Further, many modifications may be made in the apparatus with relation to the design of the column or of individual portions thereof as well as of the external charcoal system, providing, however, that the desired pressure differential may be induced within the column as described, and may be compensated for in the external charcoal system.

For example, in the process illustrated in the drawing, no C₄ side cut need be taken, and the C₄ may be removed with either the rich gas or the lean gas; or if it is desired to separate a feed gas into more numerous fractions there may be included within the column two or more rectification sections whereby one or more intermediate heart cuts may be obtained from the gaseous feed in a manner as hereinbefore set forth. These additional rectification sections will be placed within the column at a point above the sealing section and will therefore be at a pressure substantially equal to that of the adsorption section.

The particular example described with reference to the drawing constituted the separation of a simple hydrocarbon mixture and referred particularly to an operation in which a pressure differential between the adsorption and stripping sections of about 7 pounds was maintained by operating the adsorption section at atmospheric pressure, and the stripping section at about 8 pounds absolute. In such an operation, the height of each leg 41 and 41' is about 20 to 30 feet. It is to be understood, however, that the pressure differential induced may be of any desired magnitude. The upper limit of this differential is controlled only by the length of the sealing tubes in the sealing section. Thus the feed gas may be introduced to the adsorption section at pressures as high as 200 to 300 pounds or more and the stripping may be accomplished at pressures of substantially any amount less than this, as for example, 50 pounds or less. Further, as hereinbefore set forth the dual pressure adsorption process of the invention may be conveniently utilized in the separation of substantially any gaseous mixture by selective adsorption and is in no way limited to a specific separation of a gaseous feed such as that described.

The following example will serve to illustrate the effectiveness of the process of the invention in reducing the normally required stripping temperature, i. e., the temperature in the steaming section, which as hereinbefore mentioned may be appreciably reduced without sacrifice of stripping efficiency.

*Example I*

Into an adsorption column substantially similar to the one described, except that only a single sealing leg 41 is employed in place of the two-leg system shown in the drawing is introduced a feed gas of the following composition:

| Constituent | Per Cent |
| --- | --- |
| Hydrogen | 8.0 |
| C₁ Hydrocarbon | 14.0 |
| C₂ Hydrocarbon | 43.0 |
| C₃ Hydrocarbon | 19.0 |
| C₄ Hydrocarbon | 12.1 |
| C₅ and heavier hydrocarbon | 3.9 |

The pressure in the adsorption section in this operation is maintained at approximately atmospheric and the pressure in the stripping section at about 7 pounds per square inch absolute. The length of sealing leg 41 is about 50 feet, and the length of sealing tubes 22 is about 3 feet. Inasmuch as the pressure drop between the adsorption section and the stripping section is in the direction of flow of the charcoal the sealing tubes may be of substantially any length depending only upon the amount of recycle required to take down these tubes with the charcoal to effectuate this pressure drop. It has been found that tubes of from 3 to 6 feet in length are highly satisfactory for a pressure drop of this magnitude, in that an excessive recycle is not required in order to accomplish this drop.

The normal stripping temperature in the steaming section to accomplish the substantially complete removal of the adsorbed C₄ and C₅ hydrocarbons from the carcoal in a feed such as the one here employed is approximately 230° F. when operating at atmospheric pressure. By the maintenance of a 7 to 8 pound pressure differential between the adsorption section and the stripping section this temperature in the steaming section is reduced by approximately 50° F., which translated into the particular conditions herein employed will be about 180° F. It is of course apparent that the greater pressure differential the greater will be the reduction in required stripping temperature.

In the present example there is obtained from the adsorption section a lean gas of the composition set forth in Table II and from the stripping section a discharge recycle or rich gas of the composition also set forth in Table II. The remainder of the feed is recovered as a liquid $C_4$–$C_5$ hydrocarbon fraction from separator 31. The analysis of this discharge gas is set forth on a dry basis so as to give a more valid comparison with the feed gas and the lean gas.

Table II

| Gas | Lean gas Per Cent | Product Recycle or Rich Gas Per Cent |
|---|---|---|
| Hydrogen | 9.5 | |
| $C_1$ Hydrocarbon | 16.7 | |
| $C_2$ Hydrocarbon | 51.1 | |
| $C_3$ Hydrocarbon | 22.6 | 0.3 |
| $C_4$ Hydrocarbon | 0.1 | 86.0 |
| $C_5$ and Heavier Hydrocarbon | | 13.7 |

This discharge gas is passed through an interchanger into an initial separator as above described wherein the condensed steam is removed therefrom, from thence through a compressor into a second separator wherein a portion of the $C_5$'s are recovered from the $C_4$–$C_5$ mixture. The degree of separation between the $C_4$ and $C_5$ fraction will of course be a function of the temperature of the gas at this point and the degree of compression. The second separator may also take the form of an efficient fractionating column if precise separation is desired. The unliquefied gases are then returned in part to the adsorption column as described, to furnish reflux in the rectification section and to flow with the charcoal through the sealing tubes to accomplish the desired pressure drop.

In a fraction similar to the one under consideration in Example I there may be obtained a heart cut composed predominantly of $C_2$ hydrocarbons, by the inclusion of a second rectification section. This is accomplished in a manner analogous to that illustrated in the drawing, taking the methane and hydrogen as the lean gas, the $C_2$ as the heart cut, and the $C_3$ and heavier as the rich gas; refluxing the saturated charcoal in the second rectification section with the rich gas to desorb the $C_2$ hydrocarbons adsorbed thereon, removing a portion of these desorbed $C_2$ hydrocarbons from this second rectification section as the side cut and causing the other portion thereof to flow countercurrently to the charcoal into the first rectification section so as to insure therein the complete desorption of any methane or lighter gas.

In a similar fashion a heart cut composed predominantly of $C_3$ hydrocarbons may be obtained by suitable control of the operation so as to insure the recovery in the lean gas of substantially all of the $C_2$ and $C_1$ hydrocarbons together with any lighter gases and to reflux in the second rectification section $C_4$ and heavier hydrocarbons only. Also by the inclusion of three rectification sections two heart cut fractions may be obtained, one enriched in $C_2$ hydrocarbons obtained from the second rectification section and a second enriched in $C_3$ hydrocarbons obtained from the third rectification section. The method of obtaining these two heart cuts is obvious from the foregoing description of the method of obtaining either one singly.

Having described and illustrated my invention and realizing that many modifications thereof may occur to those skilled in the art without departing from the spirit or scope of the invention, I claim:

1. A continuous process for the separation of gaseous mixtures by selective adsorption and desorption which comprises contacting said gaseous mixtures with a moving bed of granular solid adsorbent so as to cause adsorption of the more readily adsorbable components by said adsorbent, separating the unadsorbed components of said gaseous mixture from the enriched adsorbent, desorbing a portion of the adsorbed components from the enriched adsorbent by contacting said enriched adsorbent with further quantities of the more readily adsorbable components of said gaseous mixture, flowing said enriched adsorbent through a sealing section and into a stripping section wherein the said adsorbed components are stripped from the said adsorbent by heating it while passing steam countercurrently therethrough, withdrawing said stripped components from the stripping section by means of positive suction, so as to permit the stripping of said enriched adsorbent at a pressure below that at which said adsorption takes place, and passing one portion of stripped components concurrently with the adsorbent through said sealing section, passing a second portion thereof to the said enriched adsorbent as said further quantities of the more readily adsorbable components of said gaseous mixture, and recycling said stripped adsorbent to the said adsorption step.

2. In a continuous process for the separation of a gaseous mixture by selective adsorption and desorption which comprises the steps of passing a continuously moving bed of solid adsorbent successively through an adsorption zone and a stripping zone, absorbing a portion of said gaseous mixture on said solid adsorbent in said adsorption zone, separating the unadsorbed components of said mixture from said adsorbent and stripping said adsorbent in said stripping zone to recover therefrom said adsorbed components of said mixture the improvement comprising depressuring a gas concurrently with adsorbent through a sealing zone between said adsorption zone and said stripping zone to establish a reduced pressure in said stripping zone relative to said adsorption zone, and carrying out said stripping step at a pressure less than that maintained in said adsorption step.

3. An apparatus for the separation of gaseous mixtures by selective adsorption comprising an adsorption column provided with an adsorption zone, an intermediate sealing zone of restricted cross-sectional area, and a stripping zone, means for passing a solid adsorbent successively downward through said zones, means for introducing said gaseous mixture to said adsorption zone, means for removing the unadsorbed components of said gaseous mixture from said adsorption zone, means for heating said adsorbent in said stripping zone to desorb adsorbed components, means for removing the so desorbed components of said gaseous mixture from said stripping zone, means for compressing and introducing a portion of the desorbed components of said gaseous mixture to said adsorption zone just above said sealing zone so as to pass concurrently with said adsorbent through said sealing zone and thereby maintain the pressure differential between said stripping zone and said adsorption zone, means for recycling said stripped granular adsorbent from said stripping zone to said adsorption zone and means combined with said last named recycling means to compensate said adsorbent for the pressure differential existing between said adsorption zone and said stripping zone.

4. An apparatus for the separation of gaseous mixtures by selective adsorption and desorption in a moving bed of granular adsorbent which comprises an adsorption column provided from top to bottom with a cooling zone, an adsorption zone, at least two rectification zones, a sealing zone of restricted cross-sectional area and a stripping zone, said zones being separated from each other by means of disengagers, means for introducing said gaseous mixture to said adsorption zone, means for removing the unadsorbed components of said gaseous mixture from said adsorption zone, means for contacting granular adsorbent flowing from said adsorption zone into the first of said rectification zones with additional quantities of a component of said gaseous mixture of higher molecular weight than said unadsorbed component of said gaseous mixture, means for contacting granular adsorbent flowing from each succeeding rectification zone to the following rectification zone with additional quantities of components of said gaseous mixture of successively higher molecular weight, means for withdrawing from each rectification zone except the first one, the component of said gaseous mixture desorbed therein, means for withdrawing from said stripping zone stripped components of said gaseous mixture, means for compressing said stripped components of said gaseous mixture, means for introducing the compressed stripped components of said gaseous mixture into the last of said rectification zones so as to pass concurrently with said adsorbent through said sealing section whereby the cooling, adsorption and rectification zones may be maintained at a pressure greater than that in said stripping zone, means for conveying the stripped granular adsorbent from the said stripping zone in the bottom of said adsorption column to the said cooling zone in the top of said adsorption column and means in combination with said conveying means to compensate for the pressure differential existing in said sealing section.

5. In an apparatus for the separation of gaseous mixtures by selective adsorption and desorption in a moving bed of granular solid adsorbent which comprises an adsorption column, provided with a cooling section, an adsorption section, at least one rectification section and a stripping section, the improvement comprising a sealing section located between said stripping section and the rectification section next adjacent thereto, said sealing section comprising a series of tubes through which said adsorbent must flow before entering said stripping section, means for heating said adsorbent while passing a stream of stripping gas countercurrently therethrough, means for introducing into said adsorption column at a point directly above said sealing section a quantity of gas under a greater pressure than that existing in said stripping section, and means for withdrawing adsorbent from the lower portion of said column at one pressure and introducing the withdrawn adsorbent to the upper portion of said column at a higher pressure.

6. In an apparatus for the separation of gaseous mixtures by selective adsorption and desorption in a moving bed of granular solid adsorbent which comprises an adsorption column, provided with a cooling section, an adsorption section, at least one rectification section and a stripping section, the improvement comprising a sealing section of restricted cross-sectional area located between said stripping section and the rectification section next adjacent thereto, said sealing section comprising a series of tubes through which said adsorbent must flow before entering said stripping section and means for introducing into said adsorption column at a point directly above said sealing section a quantity of gas under a greater pressure than that existing in said stripping section, and sealing leg means for withdrawing said granular adsorbent from said stripping section and introducing said adsorbent at a higher pressure into said cooling section, said last named means comprising an elongated tube, means for conveying said adsorbent from said stripping section to the upper end of said elongated tube, and means for maintaining a column of constant height of said adsorbent in said elongated tube, and means for conveying said adsorbent withdrawn from the bottom of said elongated tube to the cooling section at the top of said adsorption column.

7. An apparatus for the separation of gaseous mixtures by selective adsorption on a granular adsorbent, which comprises an adsorption section in which said gaseous mixture is contacted with said granular adsorbent so as to absorb more readily adsorbable constituents thereof, a stripping section in which the adsorbed constituents are desorbed, and sealing leg means for maintaining said adsorption section at a higher pressure than said stripping section, said last-named means comprising an elongated tube, a pneumatic lift line, means for introducing granular solids at one pressure into the lower part of said lift line, means for introducing a lift gas into said lift line below the point of introduction of said granular solids and thereby conveying said granular solids therein to the top of said tube, means for separating said lift gas from said granular solids at the top of said tube, means for recirculating said lift gas through a blower to the lower part of said lift line, means for introducing said granular solids at the top of said tube, means for maintaining an unfluidized column of said granular solids with a constant level within said tube, means for maintaining a countercurrent flow of gas therethrough to establish a pressure differential, and means for removing granular solids from the bottom of said tube at a higher pressure.

8. An apparatus according to claim 7 in which the sealing leg comprises a plurality of tubes and pneumatic lifts and in which the means for removing the granular solids from the bottom of one tube is also the means for introducing the granular solids into the pneumatic lift of a second tube.

9. A process according to claim 1 in which the granular adsorbent is charcoal.

10. A process for the separation of a gaseous mixture by selective adsorption on a solid adsorbent which comprises allowing a bed of said adsorbent to move by gravity downward through successive zones of adsorption, sealing and heating, introducing said gaseous mixture at the lower part of said adsorption zone, withdrawing unadsorbed components of said gaseous mixture from the upper portion of said adsorption zone, withdrawing a gas comprising adsorbed components of said gaseous mixture which gas has been separated from the adsorbent at the upper portion of said heating zone, recirculating a portion of the so-withdrawn gas concurrently with said adsorbent through said sealing zone so as to maintain a higher pressure in said adsorption zone than in said heating zone, withdrawing said granular adsorbent from below said heating zone, lifting the withdrawn adsorbent to the top of a second sealing zone, withdrawing granular adsorbent from the bottom of said second sealing zone, and lifting the withdrawn adsorbent to above said adsorption zone.

11. An apparatus for the separation of a gaseous mixture by selective adsorption on a solid adsorbent which comprises an adsorption column containing at successively lower positions therein, a cooling section, an adsorption section, a sealing section of restricted cross-sectional area, and a heating section, means for passing a bed of said solid adsorbent downwardly through said column, means for transferring solid adsorbent from the bottom of said column to a lift line, means for introducing a lift gas into said lift line at a point below the entry of said solid adsorbent, means for transferring solid adsorbent from the top of said lift line to the top of a sealing leg, means for separating said solid adsorbent from said lift gas, means for returning said lift gas to the bottom of said lift line, means for maintaining a substantially constant head of solid adsorbent in said sealing leg, means for transferring solid adsorbent from the bottom of said sealing leg to a second lift line, means for introducing into said second lift line at a point below the entry of said solid adsorbent a second lift gas comprising unadsorbed components of said gaseous mixture, means for transferring solid adsorbent from the top of said second lift line to the top of said adsorption column, means for withdrawing lift gas from the top of said adsorption column, means for introducing said gaseous mixture near the bottom of said adsorption section, means for withdrawing unadsorbed components of said gaseous mixture from the upper part of said adsorption section, and means for withdrawing adsorbed components of said gaseous mixture from the upper part of said heating section.

12. An apparatus for the separation of a gaseous mixture by selective adsorption on a solid adsorbent which comprises an adsorption column containing at successively lower positions therein, a cooling section, an adsorption section, a rectifying section, a sealing section of restricted cross-sectional area, and a heating section, means for passing a bed of said solid adsorbent downwardly through said column, means for transferring solid adsorbent from the bottom of said column to a lift line, means for introducing a lift gas into said lift line at a point below the entry of said solid adsorbent, means for transferring solid adsorbent from the top of said lift line to the top of a sealing leg, means for separating said solid adsorbent from said lift gas, means for returning said lift gas to the bottom of said lift line, means for maintaining a substantially constant head of solid adsorbent in said sealing leg, means for transferring solid adsorbent from the bottom of said sealing leg to a second lift line, means for introducing into said second lift line at a point below the entry of said solid adsorbent a second lift gas comprising unadsorbed components of said gaseous mixture, means for transferring solid adsorbent from the top of said second lift line to the top of said adsorption column, means for withdrawing lift gas from the top of said adsorption column, means for introducing said gaseous mixture near the bottom of said adsorption section, means for withdrawing unadsorbed components of said gaseous mixture from the upper part of said adsorption section, means for withdrawing adsorbed components of said gaseous mixture from the upper part of said heating section, and means for compressing a portion of the withdrawn adsorbed components and introducing the compressed gas into the lower part of said rectifying section.

13. In an apparatus for the separation of gaseous mixtures by selective adsorption and desorption in a moving bed of a granular solid adsorbent which comprises an adsorption column provided with an adsorption section, at least one rectification section and a stripping section, the improvement which comprises a sealing section of restricted cross-sectional area located between said stripping section and the rectification section adjacent thereto, means for introducing into said adsorption column at a point directly above said sealing section a quantity of gas sufficient to maintain said last named rectification section under a greater pressure than that existing in said stripping section, and sealing leg means whereby said granular adsorbent may be withdrawn from said column below said stripping section and introduced at a higher pressure into said column above said adsorption section, said last named means comprising an elongated tube containing a compact bed of adsorbent, means for conveying said adsorbent from the lower portion of said column to the upper portion of said elongated tube, and means for conveying adsorbent withdrawn from the lower portion of said elongated tube to the upper portion of said adsorption column.

14. In an apparatus for the separation of gaseous mixtures by selective adsorption and desorption in a moving bed of granular solid adsorbent which comprises an adsorption column provided with a cooling section, an adsorption section, at least one rectification section and a stripping section, the improvement comprising a sealing section of restricted cross-sectional area located between said stripping section and the rectification section next adjacent thereto, said sealing section comprising a series of tubes through which said adsorbent must flow before entering said stripping section means for withdrawing from said adsorption column a gas separated from the adsorbent at a point directly below said sealing section, means for subjecting a portion of the withdrawn gas to a greater pressure than that existing in said stripping section and means for introducing the so pressurized gas into said adsorption column at a point directly above said sealing section, and sealing leg means whereby said granular adsorbent may be withdrawn from said stripping section and introduced at a higher pressure into said cooling section, said last named means comprising an elongated tube, means for conveying said adsorbent from said stripping section to the upper end of said elongated tube, and means for maintaining a column of constant height of said adsorbent in said elongated tube, and means for conveying said adsorbent withdrawn from the bottom of said elongated tube to the cooling section at the top of said adsorption column.

15. An apparatus for the separation of a gaseous mixture by selective adsorption on a solid adsorbent which comprises a sealing leg containing an elongated substantially compact bed of solid adsorbent, a separate adsorption column containing at successively lower positions therein an adsorption section, a sealing section of restricted cross-sectional area, and a stripping section, means for permitting a bed of said solid adsorbent to pass downwardly successively through said sections of said column, means for lifting solid adsorbent from the bottom of said column to the top of said sealing leg, means for lifting solid adsorbent from the bottom of said sealing leg to the top of said adsorption column, means for introducing said gaseous mixture into said adsorption section, means for withdrawing unadsorbed components of said gaseous mixture from said adsorption section, and means for withdrawing from said adsorption column a gas separated from the adsorbent at the upper part of said stripping section, said gas comprising components of said gaseous mixture desorbed in said stripping section, as well as gas which has been passed through the sealing section to establish a pressure differential whereby said stripping section is maintained at a lower pressure than said adsorption section.

16. An apparatus according to claim 15 in which there is also provided means for introducing a portion of the adsorbed components separated from the upper part of the stripping section into said column at a point just above said sealing section so as to provide for recirculation of said gas concurrently with the adsorbent through said sealing section.

CLYDE H. O. BERG.

REFERENCES CITED

The following references are of record in the file of this patent:

UNITED STATES PATENTS

| Number | Name | Date |
|---|---|---|
| 727,030 | Tilghman | May 5, 1903 |
| 1,422,007 | Soddy | July 4, 1922 |
| 1,498,630 | Jensen | June 24, 1924 |
| 1,577,534 | Miller | Mar. 23, 1926 |
| 1,934,075 | Lewis | Nov. 7, 1933 |
| 2,310,377 | Voorhees | Feb. 9, 1943 |
| 2,311,564 | Munday | Feb. 16, 1943 |
| 2,376,365 | Lassiat | May 22, 1945 |
| 2,384,311 | Kearby | Sept. 4, 1945 |
| 2,408,600 | Berg | Oct. 1, 1946 |
| 2,519,873 | Berg | Aug. 22, 1950 |